(12) United States Patent
Dietz

(10) Patent No.: US 10,357,016 B1
(45) Date of Patent: Jul. 23, 2019

(54) FOLD UP KNOCK DOWN ANIMAL ENCLOSURE

(71) Applicant: Dan Dietz, Richmond, TX (US)

(72) Inventor: Dan Dietz, Richmond, TX (US)

(*) Notice: Subject to any disclaimer, the term of this patent is extended or adjusted under 35 U.S.C. 154(b) by 0 days.

(21) Appl. No.: 16/282,667

(22) Filed: Feb. 22, 2019

(51) Int. Cl.
 *A01K 1/03* (2006.01)
 *A01K 1/02* (2006.01)
 *A01K 1/00* (2006.01)

(52) U.S. Cl.
 CPC ............ *A01K 1/0017* (2013.01); *A01K 1/03* (2013.01); *A01K 1/0245* (2013.01)

(58) Field of Classification Search
 CPC ...... A01K 1/0017; A01K 1/03; A01K 1/0035; A01K 1/0125; A01K 1/0236; A01K 1/0245; A01K 1/0272; A01K 1/031; A01K 1/033; A01K 1/034; E04B 1/3445
 See application file for complete search history.

(56) References Cited

U.S. PATENT DOCUMENTS

| | | | | |
|---|---|---|---|---|
| 4,391,223 A * | 7/1983 | Holland | ................. | A01K 1/033 119/499 |
| 5,320,065 A * | 6/1994 | Leopold | ............... | A01K 15/025 119/498 |
| 5,383,422 A * | 1/1995 | Morris | .................... | A01K 1/033 119/168 |
| 5,727,502 A * | 3/1998 | Askins | .................... | A01K 1/033 119/499 |
| 5,752,470 A * | 5/1998 | Koneke | ................ | A01K 1/0125 119/499 |
| 5,865,140 A * | 2/1999 | McGivern | ............ | A01K 1/0125 119/168 |
| 2006/0107903 A1* | 5/2006 | Jin | ......................... | A01K 1/033 119/499 |
| 2010/0258059 A1* | 10/2010 | Lott | ..................... | A01K 1/0245 119/499 |
| 2010/0313822 A1* | 12/2010 | Huang | ..................... | A01K 1/03 119/453 |
| 2013/0036986 A1* | 2/2013 | Callari | .................. | A01K 1/033 119/702 |

* cited by examiner

*Primary Examiner* — Trinh T Nguyen
(74) *Attorney, Agent, or Firm* — Kristin A. Grant; Grant Attorneys at Law PLLC

(57) ABSTRACT

Disclosed herein is an animal housing comprises a base member hingedly attached to a rear wall, side walls hingedly attached to the rear wall, a front wall removably attached to at least a portion of the first side walls or the base member and a top member arranged parallel to the base member, wherein the animal housing has an erect arrangement in which an interior chamber is formed and a collapsed arrangement wherein the sidewalls and the rear wall occupy individual planes located essentially parallel to the plane formed by the base member.

17 Claims, 8 Drawing Sheets

US 10,357,016 B1

FOLD UP KNOCK DOWN ANIMAL ENCLOSURE

BACKGROUND OF THE INVENTION

This invention relates to animal furniture and more specifically to collapsible animal furniture. The animal furniture may also have an interior chamber and a sliding door disposed in a track which may open or close to permit egress into or out of the interior chamber.

Animal housings have been conventionally offered as fully assembled units. However, the size of such units presents issues related to providing such units to end users by readily available, conventional means such as postal delivery or via courier. Accordingly, an animal housing amenable to shipment via courier is desired.

SUMMARY OF THE INVENTION

These and other needs in the art are addressed by the present invention. In a first aspect, an animal housing comprises a base member hingedly attached to a rear wall along a horizontal bottom edge of the rear wall; a first side wall hingedly attached along a rear vertical edge of the first side wall to a first vertical edge of the rear wall; a second side wall hingedly attached along a rear vertical edge of the second side wall to a second vertical edge of the rear wall; a front wall removably attached to at least a portion of a front vertical edge of the first side wall and simultaneously removably attached to at least a portion of a front vertical edge of the second side wall; a top member arranged parallel to the base member which is removably engaged with at least a portion of the rear wall, the first sidewall, the second sidewall, the front wall or a combination thereof; wherein the animal housing has an erect arrangement in which an interior chamber is formed, the interior chamber bound by the rear wall, the first sidewall, the second sidewall, the front wall, the base member, and the top member; wherein the front wall comprises a door comprising a door panel dimensioned and arranged to cooperate with a doorway formed in the front wall of the animal housing to allow egress into or out of the interior chamber in an open position, and to prevent egress into or out of the interior chamber in a closed position; and wherein the animal housing has a collapsed arrangement wherein the front wall is unattached to at least one of the sidewalls and wherein each of the sidewalls is rotated along the rear vertical edge such that at least a portion of each of the side walls occupies a plane located essentially parallel to the plane formed by the rear wall, and wherein the rear wall is rotated along the horizontal bottom edge such that at least a portion of each of the side walls and at least a portion of the rear wall each occupy a plane located essentially parallel to the plane formed by the bottom member.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE INVENTION

Figure 1:
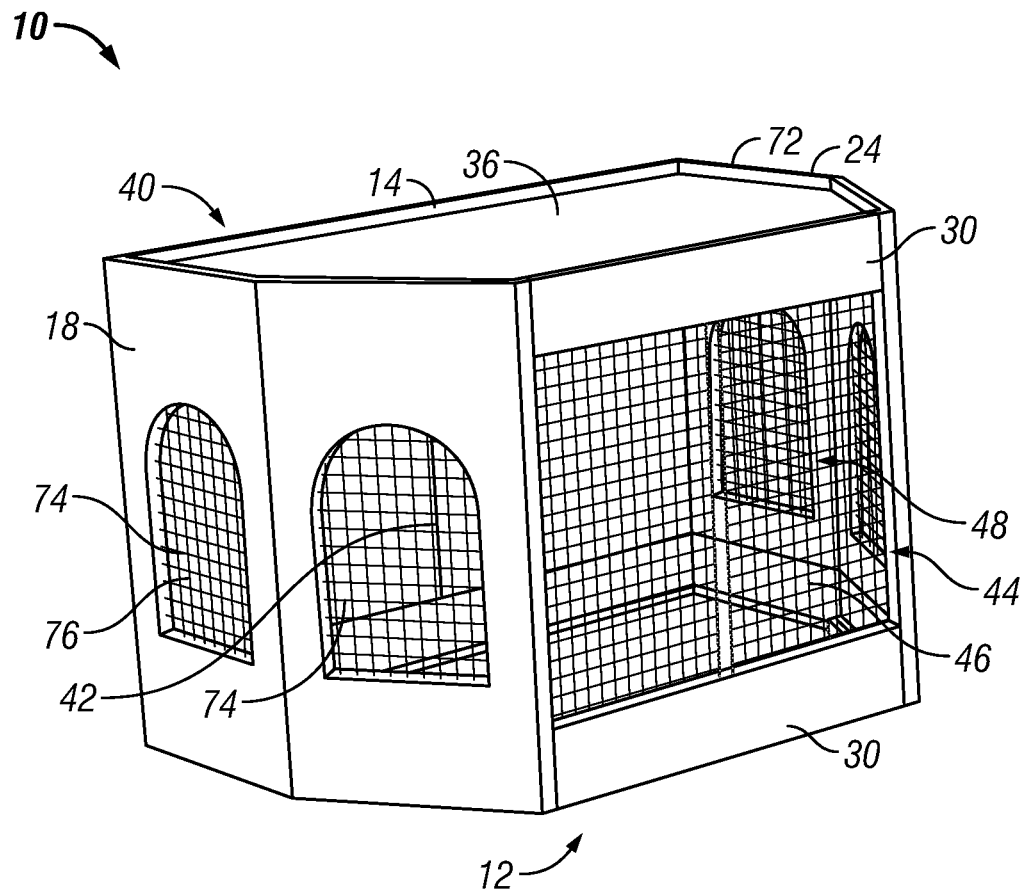
FIG. 1 illustrates an animal housing in an erect arrangement according to an embodiment of the present disclosure.
Figure 2:
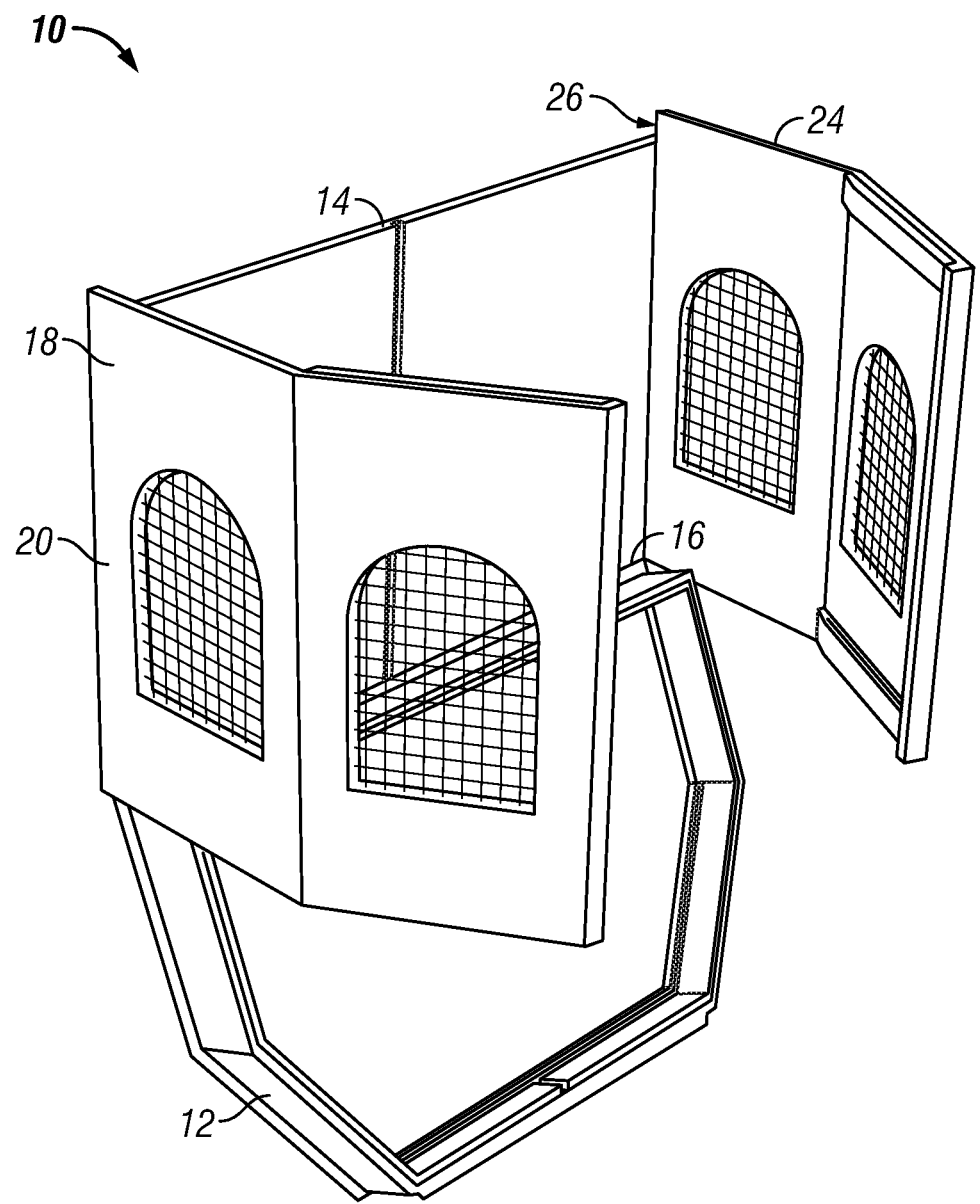
FIG. 2 illustrates an embodiment of FIG. 1 with the bottom member in a rotated position in a partially collapsed arrangement.
Figure 3:
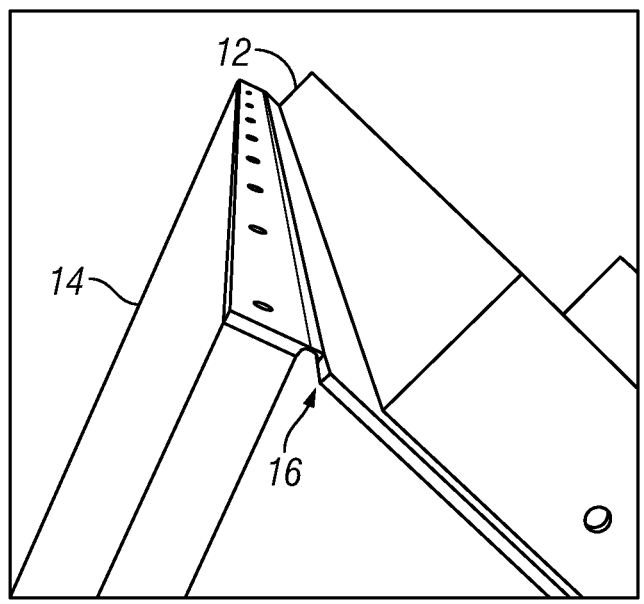
FIG. 3 illustrates a rear wall hingedly attached to the bottom member in a partially collapsed arrangement according to an embodiment of the present disclosure.
Figure 4:
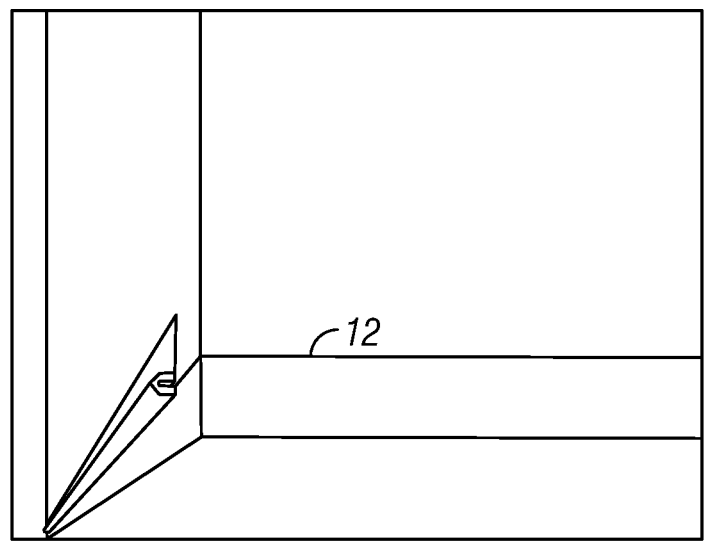
FIG. 4 illustrates the embodiment of FIG. 3 in an erect arrangement according to an embodiment of the present disclosure.

Referring now to the figures, where similar reference characters denote similar elements throughout, FIG. 1 illustrates an embodiment of animal housing, generally referred to as 10, comprising a base member 12 hingedly attached to a rear wall 14 along a horizontal bottom edge 16 of rear wall 14, which is shown in FIG. 2. As shown in FIG. 3, in an embodiment, base member 12 may be hingedly attached to a rear wall 14 along horizontal bottom edge 16 of rear wall 14 by a continuous hinge, which may further be integral to bottom member 12.

As shown in FIG. 2, in an embodiment, a first side wall 18 may be hingedly attached along a rear vertical edge 20 of first side wall 18 to a first vertical edge 22 of rear wall 14. A second side wall 24 may be hingedly attached along a rear vertical edge 26 of second side wall 24 to a second vertical edge 28 of rear wall 14.

Figure 6:
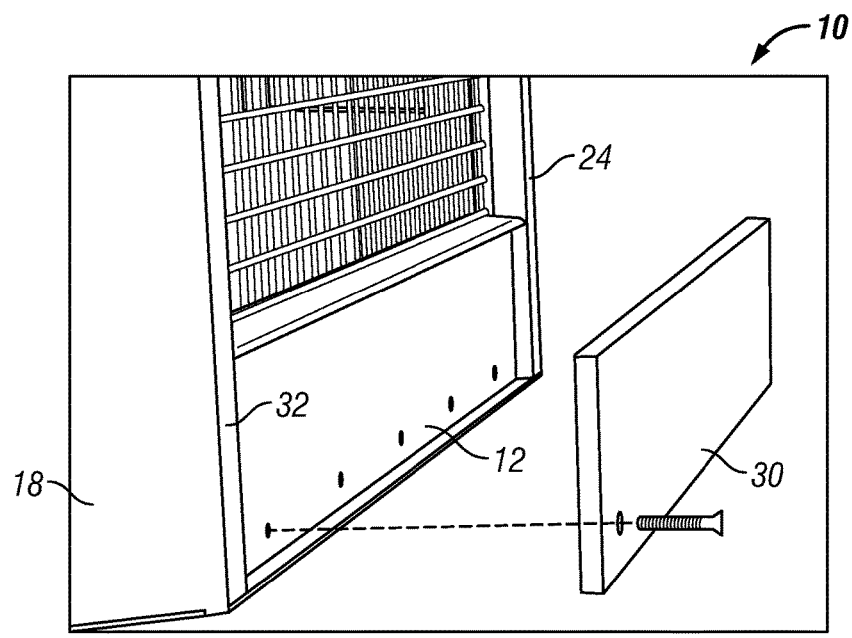
FIG. 6 illustrates a front wall removed from the embodiment of FIG. 1.

Animal enclosure 10 may further comprise a front wall 30 removably attached to at least a portion of a front vertical edge 32 of first side wall 18 and simultaneously removably attached to at least a portion of a front vertical edge 34 of second side wall 24. A portion of front wall 30 may also be removably attachable to base member 12, as shown in FIG. 6. In an embodiment, animal enclosure 10 may further comprise a top member 36 arranged parallel to 80 base member 12 which top member 36 is removably engaged with at least a portion of rear wall 14, first sidewall 18, second sidewall 24, front wall 30, or a combination thereof.

In an embodiment, animal housing 10 has an erect arrangement 40 shown in FIG. 1, in which an interior chamber 42 is formed, interior chamber 42 being bound by rear wall 14, first sidewall 18, second sidewall 24, front wall 30, base member 12, and top member 36. Front wall 30 may further comprise a doorway 44 comprising a door panel 46 dimensioned and arranged to cooperate with doorway 44 formed in front wall 30 of animal housing 10 to allow egress into or out of the interior chamber 42 in an open position (not shown) and to prevent egress into or out of the interior chamber 42 in a closed position 48 shown in FIG. 1. Each of the walls may be attached to the base member 12 via screws, clamps, or the like to anchor the animal housing together. In an embodiment, base member 12 may further comprise a drain hole (not shown), a plurality of longitudinal support ribs and/or axial support ribs located on an outer face of base member 12, which is external to inner chamber 42. In an embodiment, base member 12 may comprise a plurality of castors (not shown), which may include locking castors, attached to an outer face of base 12. In an embodiment, base member 12 comprises an injection molded plastic.

Figure 10:
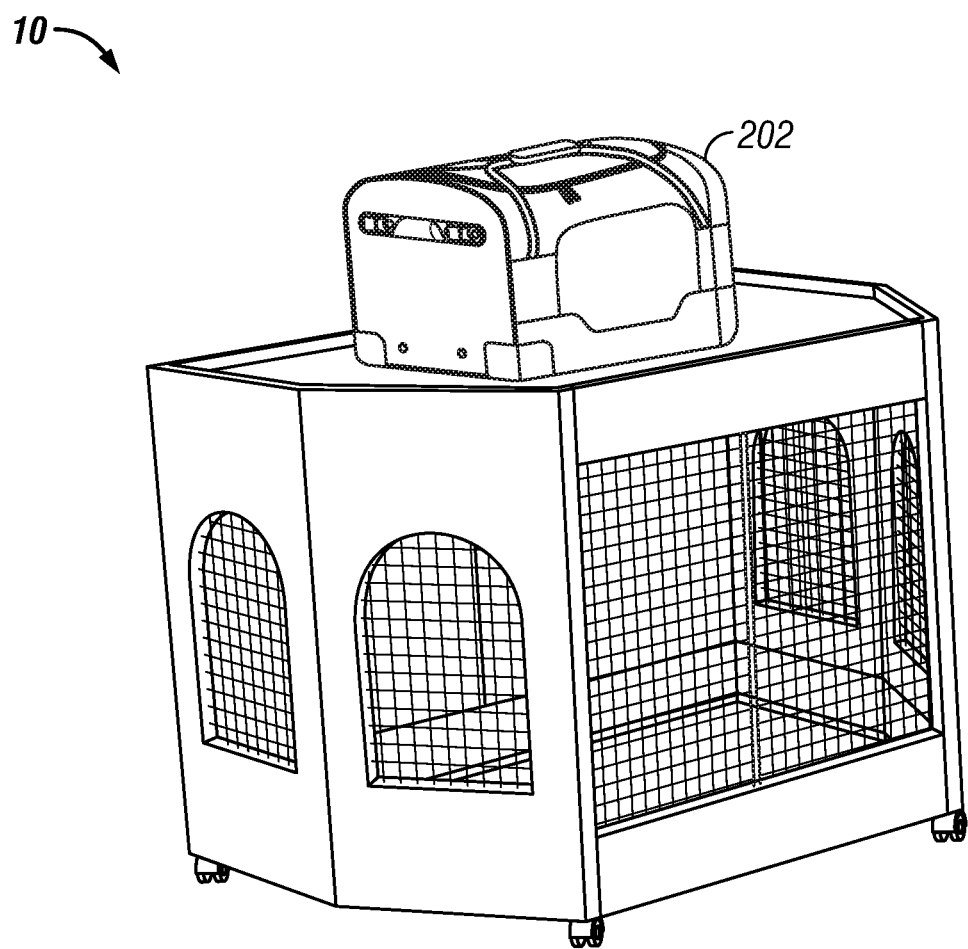
FIG. 10 illustrates an embodiment of the present invention where the top member may be used as a luggage rack.

In an embodiment, the animal housing may include a divider 80 which divides the inner chamber 42 into two or more parts. The divider may be a grate or a solid wall, and is preferably removable from the housing, and may be secured to the rear wall by a notch or channel attached to the rear wall or to a notch or channel in the base member of the housing 100 (shown in FIG. 10).

Figure 5:
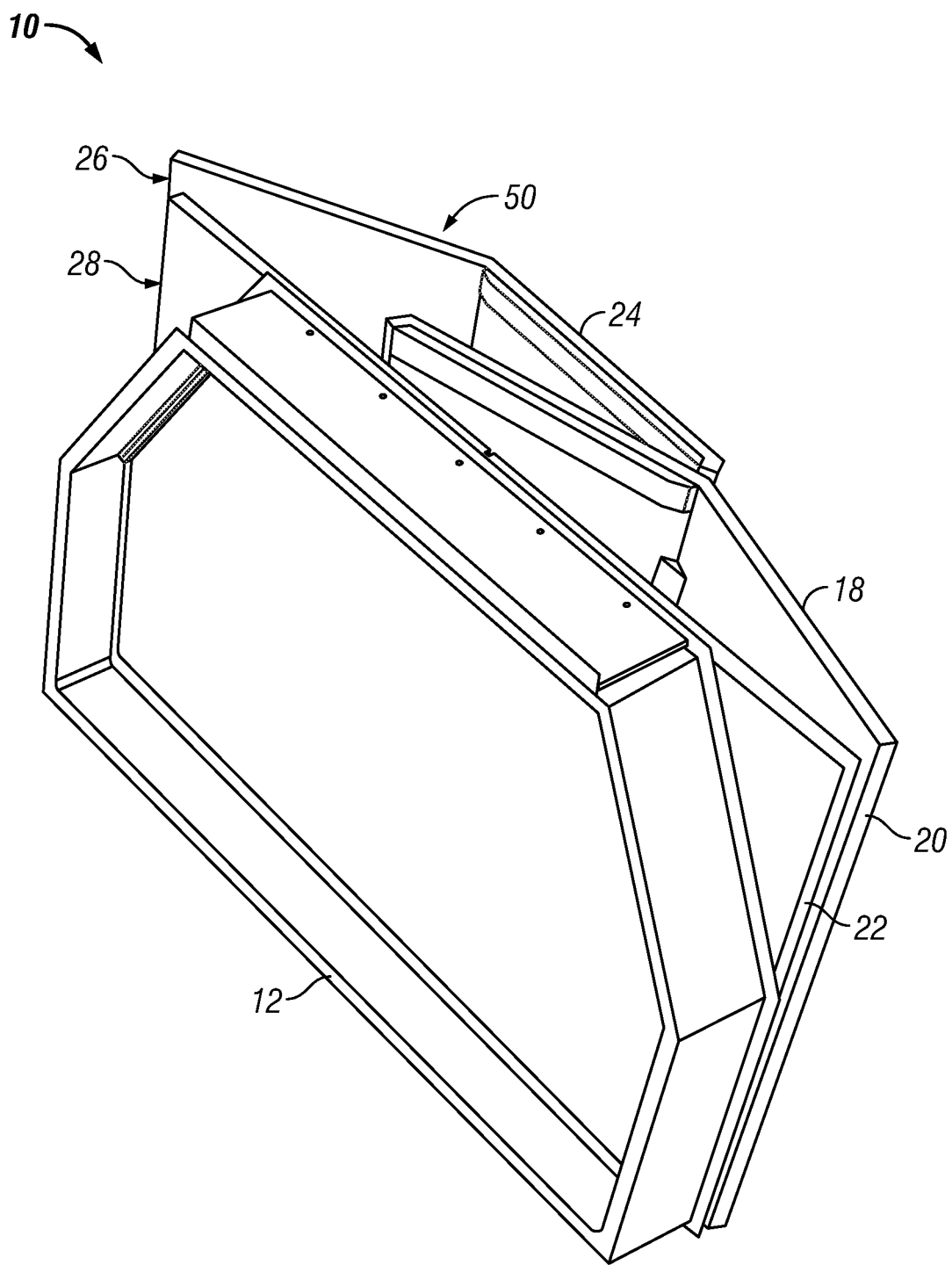
FIG. 5 illustrates the embodiment of FIG. 1 in a collapsed arrangement according to an embodiment of the present disclosure.

In an embodiment, animal housing 10 has a collapsed arrangement 50 (shown in FIG. 5), wherein front wall 30 is unattached to at least one of the sidewalls 18 or 24, and wherein each of the sidewalls 18 and 24 are rotated along rear vertical edge 20 and 26 such that at least a portion of each of the side walls 18 and 24 occupies a plane located essentially parallel to the plane formed by rear wall 20, and wherein rear wall 14 is rotated along horizontal bottom edge 16 such that at least a portion of each of the side walls 18 and 24 and at least a portion of rear wall 14 each occupy a plane located essentially parallel to the plane formed by bottom member 12 as shown in FIG. 5. It is to be understood that sidewalls 18 and 24 need not be planer as is shown in the embodiment of the Figures, however, for purposes herein, a sidewall is considered to occupy a plane located essentially parallel to the plane formed by bottom member 12 when the rear vertical edge of the sidewall and the front vertical edge of the sidewall are essentially coplanar, and wherein the plane occupied by the rear vertical edge of the sidewall and the front vertical edge of the sidewall is essentially parallel to the plane formed by rear wall 20.

It is to be further understood that animal housing 10 is not limited to side walls 18 and 24, but may instead include any number of sides (e.g., a plurality of side walls) depending, for instance, on the desired configuration, as exemplified in the animal housing disclosed in U.S. patent application Ser. No. 11/459,868, which is incorporated by reference herein in its entirety.

Figure 7:
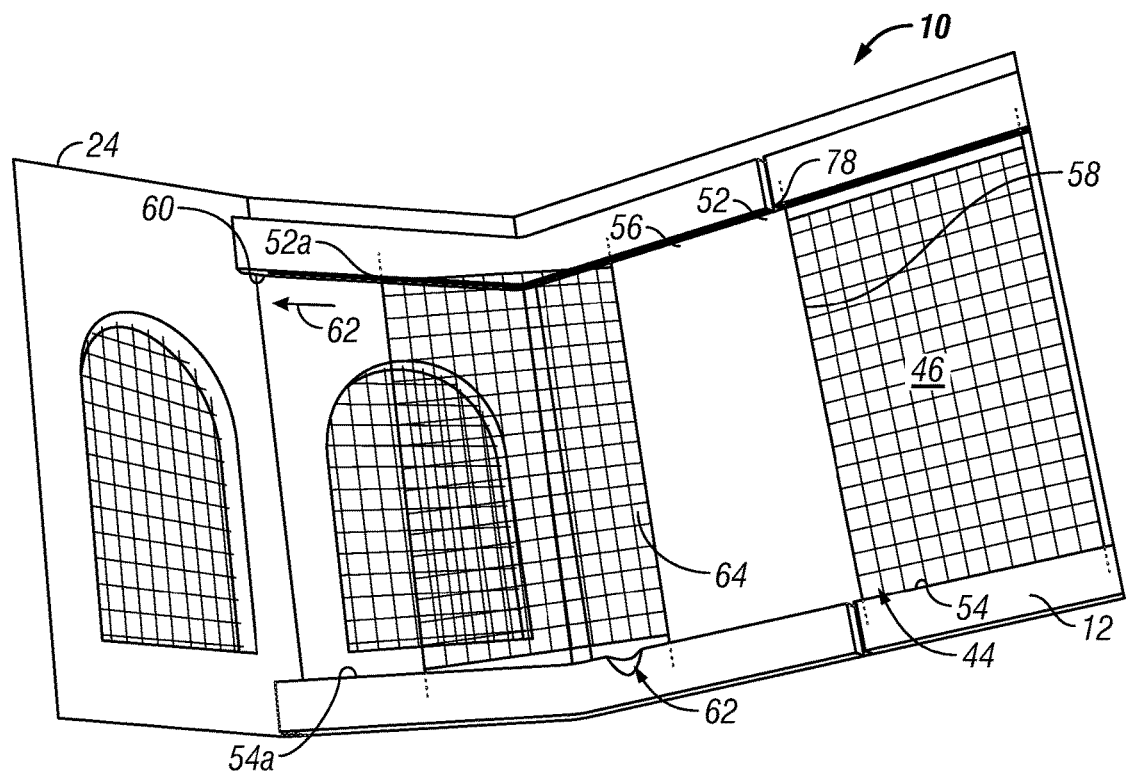
FIG. 7 illustrates the upper and lower slide elements according to an embodiment of the present disclosure.
Figure 8:
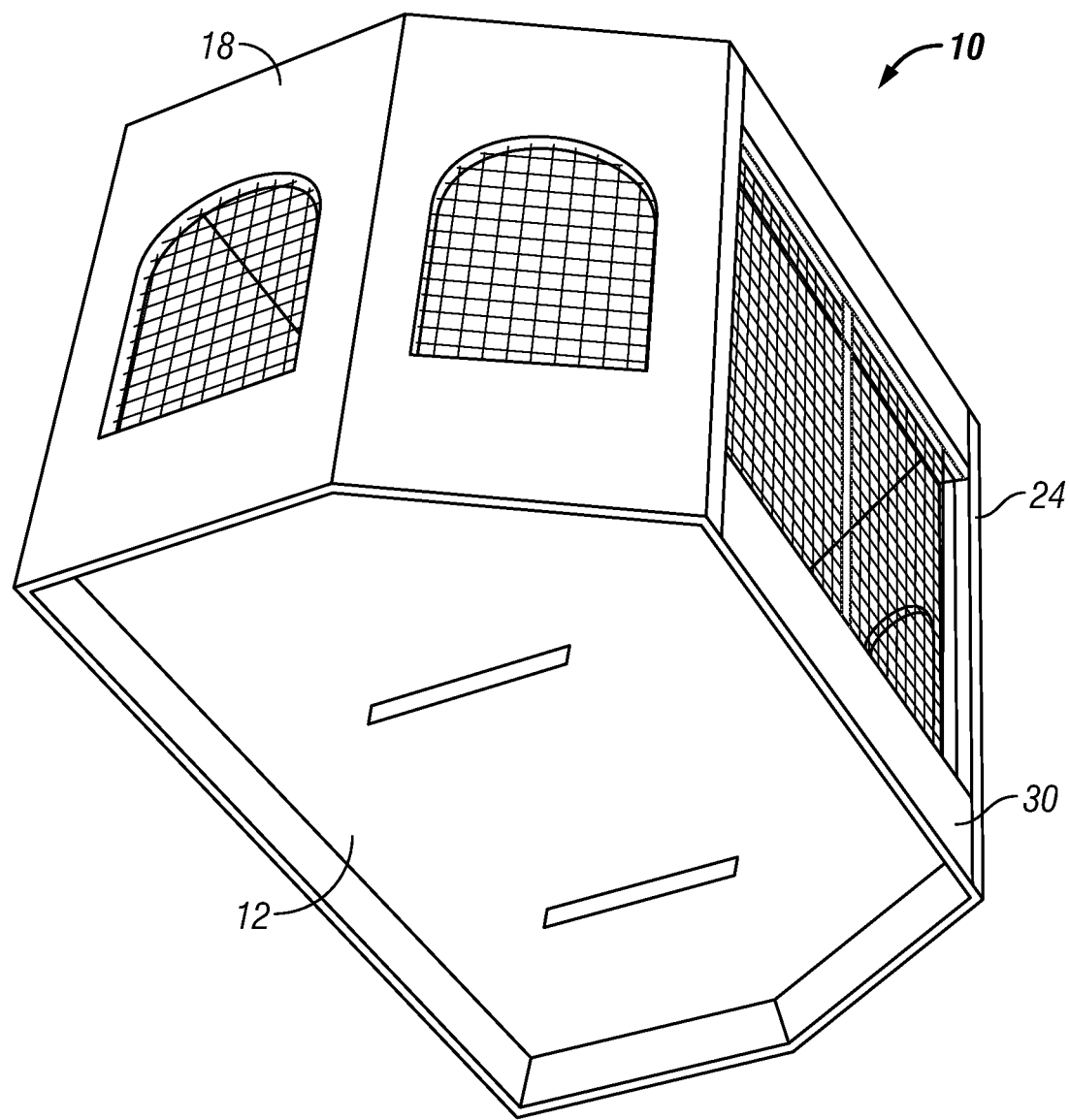
FIG. 8 illustrates a bottom perspective view of the embodiment of FIG. 1.

As shown in FIG. 7, in an embodiment, the animal housing may include a door panel 46 which comprises a first slide element 52 and a second slide element 54 projecting transversely from a first peripheral edge 56 of door panel 46, wherein first slide element 52 is disposed adjacent a first peripheral side 58 of door panel 46, wherein the side is transverse with respect to the edge 56, and wherein second slide element 54 is laterally spaced from first slide element 52 away from first peripheral side 58 of door panel 46. The embodiment may further comprise a first track 60 disposed adjacent first peripheral edge 56 of doorway 44 to slideably receive first slide element 52 and define a lateral path of motion 62 for first slide element 52 along doorway 44 and a second track 62 disposed transversely with respect to doorway 44 opening to slideably receive the second slide element 54 and define a transverse path of motion 62 for the second slide element 54 toward and away from the doorway 44.

Figure 9:
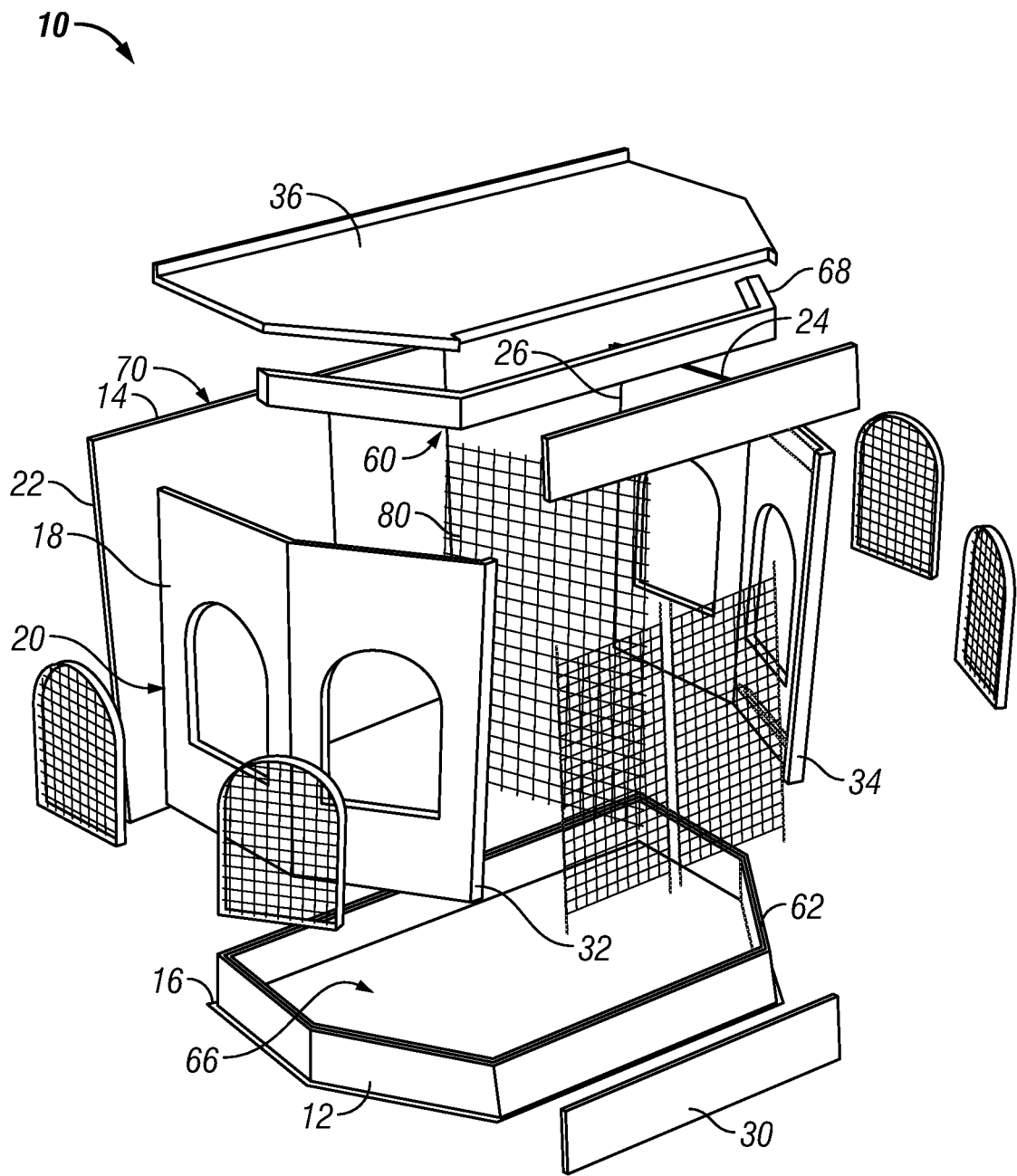
FIG. 9 illustrates an exploded view of the embodiment of FIG. 1.

In an embodiment, the door panel 46 may comprise a grating. In and embodiment, the first and second tracks 60 and 62 are formed on an upper surface 66 of bottom panel 12 of housing 10 (see FIG. 9). In an embodiment, second track 62 is disposed adjacent a sidewall 18 and/or 24 of the housing within the interior chamber 42 of the housing 10.

As shown in FIG. 7, in an embodiment, animal housing 10 may comprise a first pair 52 and 52a and a second pair 54 and 54a of the slide elements projecting from opposite peripheral edges of door panel 46, wherein the first pair of slide elements are coaxially aligned adjacent the first peripheral side of the door panel, and wherein the second pair of slide elements are coaxially aligned adjacent a second peripheral side of the door panel opposite the first peripheral side. In an embodiment, a first pair of opposing tracks 60 and 62 comprise an upper portion 60 and a lower portion 62, each disposed adjacent opposite peripheral edges of the doorway to slideably receive the respective first pair of slide elements and define a lateral path of motion for the first peripheral side of the door panel along the doorway; a second pair of opposing tracks comprising an upper portion and a lower portion, each disposed transversely with respect to the doorway and disposed adjacent opposite peripheral edges of the doorway to slideably receive the respective second pair of slide elements and define a transverse path of 145 motion for the second peripheral side of the door panel toward and away from the doorway.

In an embodiment, the second track is disposed within the interior chamber of the housing, behind a portion of the front wall between the doorway and the adjacent side wall. In an embodiment, the top member 36 may be supported on a shelf formed by inwardly projecting flanges at upper inside surfaces of one or more of the front wall, the first sidewall, the second 150 sidewall, or the rear wall. As shown in FIG. 7, in an embodiment, the upper portions of the first and second pairs of tracks may be disposed within at least a portion of the flanges. In an embodiment, top member 36 may be hingedly attached to an upper horizontal edge 70 of rear wall 14, wherein the top member may be rotated along the upper horizontal edge of the rear wall such that at least a portion of the top member occupies a plane located essentially parallel to the plane formed by the bottom member when the animal housing is in the collapsed arrangement 50 shown in FIG. 5. In an embodiment, a top lip 72 may extend about at least a portion of an upper perimeter of the animal housing, wherein the top lip 72 projects above a horizontal plane formed by the top member 36 when the animal housing is in the erect position 40. In an embodiment, animal housing 10 comprises more than one opening 74, which may include a grate 76 disposed to cover each of the openings.

In an embodiment, each of the sidewalls 18 and 24, the bottom member 12, the top member 36 and the front wall 30 comprise metal, natural or synthetic wood, veneer, vinyl, wicker, plastic, ceramic, or a combination thereof. In an embodiment, a cushion (not shown) may be disposed in the interior chamber of the housing, on the top member external to the interior chamber, or a combination thereof. In an embodiment, the bottom member 12 may further include a floor grate disposed within the interior chamber of the housing, adjacent to a bottom member of the housing, wherein the floor grate is formed from a single piece of grating, or wherein the floor grate comprises a plurality of interlocking pieces of grating. In an embodiment, a pan (not shown) may be disposed within the interior chamber of the housing between the bottom member and a floor grate to collect waste produced by an animal. In an embodiment, the first and/or second slide elements 52 and/or 54 may comprise a bushing 78 and/or a bearing dimensioned and arranged to fit within at least a portion of the first or second track. In an embodiment, the animal housing 10 may be used as a luggage rack wherein the top member 36 may be used to hold an item of luggage.

It should be understood, of course, that the foregoing relates to preferred embodiments of the invention and that modifications may be made without departing from the spirit and scope of the invention as set forth in the following claims.

What is claimed is:

1. An animal housing comprising a base member hingedly attached to a rear wall along a horizontal bottom edge of the rear wall;
    a first side wall hingedly attached along a rear vertical edge of the first side wall to a first vertical edge of the rear wall;
    a second side wall hingedly attached along a rear vertical edge of the second side wall to a second vertical edge of the rear wall;
    a front wall removably attached to at least a portion of a front vertical edge of the first side wall and simultaneously removably attached to at least a portion of a front vertical edge of the second side wall; and
    a top member arranged parallel to the base member which is removably engaged with at least a portion of the rear wall, the first sidewall, the second sidewall, the front wall or a combination thereof;
    wherein the animal housing has an erect arrangement in which an interior chamber is formed, the interior chamber bound by the rear wall, the first sidewall, the second sidewall, the front wall, the base member, and the top member;
    wherein the front wall comprises a doorway comprising a door panel dimensioned and arranged to cooperate with a doorway formed in the front wall of the animal housing to allow egress into or out of the interior chamber in an open position, and to prevent egress into or out of the interior chamber in a closed position;
    wherein the animal housing has a collapsed arrangement wherein the front wall is unattached to at least one of the sidewalls and wherein each of the sidewalls is rotated along the rear vertical edge such that at least a portion of each of the side walls occupies a plane located essentially parallel to the plane formed by the rear wall, and wherein the rear wall is rotated along the horizontal bottom edge such that at least a portion of each of the side walls and at least a portion of the rear wall each occupy a plane located essentially parallel to the plane formed by the bottom member.

2. The animal housing of claim 1, wherein the door panel comprises first and second slide elements projecting transversely from a first peripheral edge of the door panel, wherein the first slide element is disposed adjacent a first peripheral side of the door panel, wherein the side is transverse with respect to the edge, and wherein the second slide element is laterally spaced from the first slide element away from the first peripheral side of the door panel;
    a first track disposed adjacent a first peripheral edge of the doorway to slideably receive the first slide element and define a lateral path of motion for the first slide element along the doorway;
    a second track disposed transversely with respect to the door opening to slideably receive the second slide element and define a transverse path of motion for the second slide element toward and away from the doorway.

3. The animal housing of claim 1 wherein the door panel comprises a grating.

4. The animal housing of claim 2 wherein the first and second tracks are formed on an upper surface of a bottom panel of the housing.

5. The animal housing of claim 4 wherein the second track is disposed adjacent a sidewall of the housing within the interior chamber of the housing.

6. The animal housing of claim 5 wherein the second track is disposed within the interior chamber of the housing, behind a portion of the front wall between the doorway and the adjacent side wall.

7. The animal housing of claim 2, comprising:
    first and second pairs of the slide elements projecting from opposite peripheral edges of the door panel, wherein the first pair of slide elements are coaxially aligned adjacent the first peripheral side of the door panel, and wherein the second pair of slide elements are coaxially aligned adjacent a second peripheral side of the door panel opposite the first peripheral side;
    a first pair of opposing tracks comprising an upper portion and a lower portion, each disposed adjacent opposite peripheral edges of the doorway to slideably receive the respective first pair of slide elements and define a lateral path of motion for the first peripheral side of the door panel along the doorway; and
    a second pair of opposing tracks comprising an upper portion and a lower portion, each disposed transversely with respect to the doorway and disposed adjacent opposite peripheral edges of the doorway to slideably receive the respective second pair of slide elements and define a transverse path of motion for the second peripheral side of the door panel toward and away from the doorway.

8. The animal housing of claim 7, wherein the top member is supported on a shelf formed by inwardly projecting flanges at upper inside surfaces of one or more of the front wall, the first sidewall, the second sidewall, or the rear wall, and wherein the upper portions of the first and second pairs of tracks are disposed within at least a portion of the flanges.

9. The animal housing of claim 1, wherein the top member is hingedly attached to an upper horizontal edge of the rear wall, wherein the top member may be rotated along the upper horizontal edge of the rear wall such that at least a portion of the top member occupies a plane located essentially parallel to the plane formed by the bottom member when the animal housing is in the collapsed arrangement.

10. The animal housing of claim 1, further comprising a top lip which extends about at least a portion of an upper perimeter of the animal housing, wherein the top lip projects above a horizontal plane formed by the top member when the animal housing is in the erect position.

11. The animal housing of claim 1, wherein the animal housing comprises more than one opening, and wherein a grate is disposed to cover each of the openings.

12. The animal housing of claim 1, wherein each of the sidewalls, the bottom member, the top member and the front wall comprise metal, natural or synthetic wood, veneer, vinyl, wicker, plastic or ceramic.

13. The animal housing of claim 1, wherein a cushion is disposed in the interior chamber of the housing, on the top member external to the interior chamber, or a combination thereof.

14. The animal housing of claim 1, further comprising a floor grate disposed within the interior chamber of the housing, adjacent to a bottom member of the housing, wherein the floor grate is formed from a single piece of grating, or wherein the floor grate comprises a plurality of interlocking pieces of grating.

15. The animal housing of claim 14, further comprising a pan disposed within the interior chamber of the housing between the bottom member and the floor grate.

16. The animal housing of claim 2, wherein the first and/or second slide elements comprise a bushing and/or a bearing dimensioned and arranged to fit within at least a portion of the first or second track.

17. The animal housing of claim 1, wherein the top member can be used for holding an item of luggage.

* * * * *